No. 880,063. PATENTED FEB. 25, 1908.
G. A. BEILFUSS.
TRIPOD.
APPLICATION FILED JUNE 7, 1907.
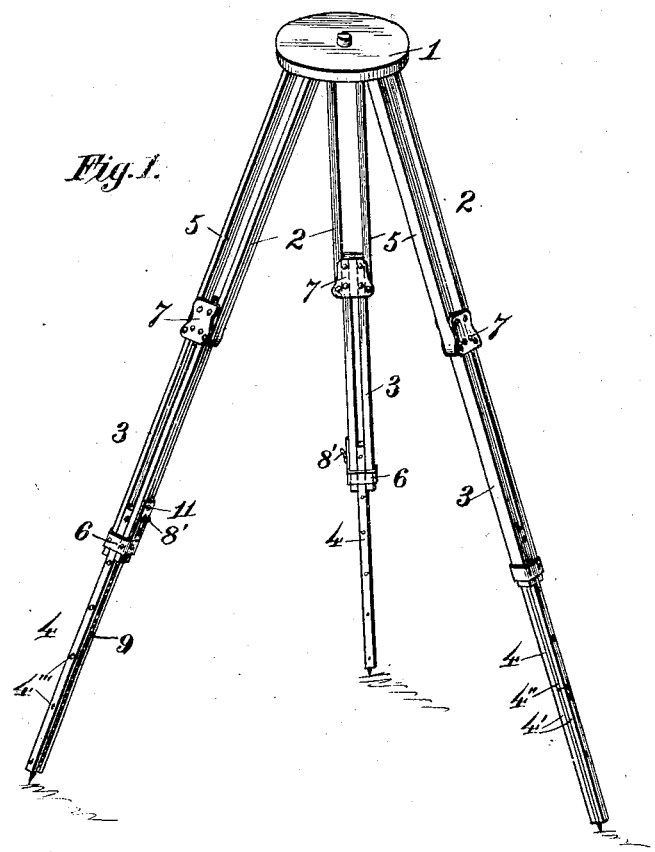
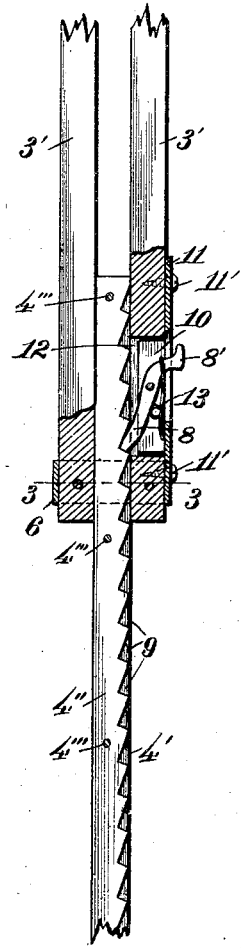
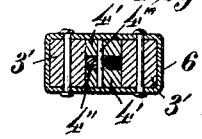
Witnesses:
H. S. Austin
F. E. Sheehy
Inventor:
George A. Beilfuss,
by
Joshua R. H. Potts
Att'y.

UNITED STATES PATENT OFFICE.

GEORGE A. BEILFUSS, OF CHICAGO, ILLINOIS.

TRIPOD.

No. 880,063.     Specification of Letters Patent.     Patented Feb. 25, 1908.

Application filed June 7, 1907. Serial No. 377,719.

*To all whom it may concern:*

Be it known that I, GEORGE A. BEILFUSS, a citizen of the United States, residing at 4189 South Halsted street, in the city of Chicago, in county of Cook and State of Illinois, have invented certain new and useful Improvements in Tripods, of which the following is a specification.

My invention relates to tripods such as are particularly adapted for use with cameras, surveyor's instruments and the like.

More especially my invention relates to adjustable tripods, that is, to tripods in which the legs may be adjusted to various lengths to suit the height of the operator or to conform to the unevenness of the ground.

The object of my invention is to provide a tripod as mentioned, the legs of which may be extended and held at any position, without the necessity of manipulating any locking devices.

A further object is to provide a telescoping leg for tripods formed of wood and to equip the lower extensible portion thereof with a metallic strengthening bar.

A further object is to provide a wooden telescoping tripod leg, having a metallic strengthening bar in the lower extensible portion, with means for automatically locking said lower portion in any desired position.

Other objects will appear hereinafter.

My invention will be more readily understood by reference to the accompanying drawings forming a part of this specification and in which, Figure 1 is a perspective view of a tripod embodying my invention in its preferred form, Fig. 2 is a detail view of a portion of one leg, upon an enlarged scale, illustrating the connection between the telescoping parts thereof, and Fig. 3 is a section upon the line, 3—3 of Fig. 2.

Referring to the drawings, 1 indicates the head of a tripod, to which are attached the legs 2. The legs may be permanently fixed to the head or may be made detachable, as desired. Each leg is composed of two or more telescoping portions. In the drawings, I have illustrated two such portions, 3 and 4 and provide a third or top portion, 5, by which it is connected to the head. It is obvious that if it is desired, the portions, 3 and 4 may telescope within the portion, 5: also that there may be several intermediate portions corresponding to the part, 3.

For the sake of lightness and to minimize the cost, I prefer to form the legs of light strips of wood. By forming them of wood, I avoid having metal parts sliding on metal, which is objectionable in devices of this character, in as much as they are subjected to more or less rough usage, whereby the parts if of metal, are liable to be roughened by abrasion or corrosion, rendering the same difficult to open or close.

The parts 3 and 5 are each formed of a pair of wooden strips rigidly spaced apart a sufficient distance to permit the next lower portion to slide between them. Being formed of two strips rigidly connected, they form non-flexible members. The lower portion, 4 is a single bar or rod. This being small and at the foot of the tripod is liable to breakage, hence, I provide the same with a strengthening bar of metal. To this end I form the bottom portion of a pair of flat strips of wood, with a metal bar of substantially the same length fixed between them. 4'—4' indicate the wooden strips and 4'' the metal bar. These are fixed together by rivets, 4''' forming a rigid unit.

The member, 4 of the construction described, slides freely between the strips 3' of which the member, 3 is formed, said strips being spaced apart at the bottom by a band, 6, and at their tops by plates, 7, riveted thereto. It will be seen by reference to Fig. 3, that when the member, 4, is telescoped within the member, 3, that the metal bar, 4'' is completely surrounded by wood.

To lock the member, 4 at any desired position with relation to the member, 3, I provide a latch or pawl, 8 in the lower end of one of the strips, 3', which pawl engages notches, 9 formed in the metal srip, 4'', of the member, 4. The pawl, 8 is mounted between ears, 10, formed upon a plate, 11, and extending within a slot, 12, in the strip, 3'. The plate, 11 is fastened to the strip, 3' as by screws, 11' and a spring, 13, holds the pawl in engagement with the notches in the member, 4.

The notches, 9 are so formed, and the pawl, 8 located in such relation thereto, that the member, 4, may be readily extended without manipulating the pawl. However, the member cannot be retracted until the pawl is first disengaged from the notches, which is done by pressing upon the end, 8' of the pawl.

It is obvious that numerous modifications of my invention may be made by one skilled in the art, hence, I do not limit myself to the exact construction shown, and hereinbefore described.

Having described my invention what I claim as new and desire to secure by Letters Patent is:

1. In a tripod a head, in combination with the legs connected thereto, each said leg comprising top, intermediate, and bottom portions, said top and intermediate portions each being formed of a pair of strips rigidly spaced apart, and said bottom portion telescoping between the strips of said intermediate portion, said bottom portion comprising a pair of flat wooden strips having a flat metal strengthening strip secured between them, there being a plurality of notches in the edge of said metal strip, and means on said intermediate portion for engaging said notches, to adjust said bottom to the intermediate portion.

2. In a tripod, a head, in combination with the legs connected thereto, each said leg comprising top, intermediate and bottom portions, said top and intermediate portions each being formed of a pair of strips rigidly spaced apart, and said bottom portion telescoping between the strips of said intermediate portion, said bottom portion comprising a pair of flat wooden strips having a flat metal strip secured between them, said metal strip having a plurality of notches in one edge thereof and a spring pressed pawl in said intermediate portion adapted to engage said notches, substantially as described.

In testimony whereof I have signed my name to this specification in the presence of two subscribing witnesses.

GEORGE A. BEILFUSS.

Witnesses:
H. S. AUSTIN,
F. E. SHEEHY.